(12) United States Patent
Nishikawa (10) Patent No.: US 8,976,879 B2
(45) Date of Patent: Mar. 10, 2015

(54) COMMUNICATION DEVICE AND COMMUNICATION METHOD

(71) Applicant: ICOM Incorporated, Osaka (JP)

(72) Inventor: Nobuyoshi Nishikawa, Osaka (JP)

(73) Assignee: ICOM Incorporated, Osaka (JP)

( * ) Notice: Subject to any disclaimer, the term of this patent is extended or adjusted under 35 U.S.C. 154(b) by 77 days.

(21) Appl. No.: 13/911,945

(22) Filed: Jun. 6, 2013

(65) Prior Publication Data

US 2013/0343371 A1   Dec. 26, 2013

(30) Foreign Application Priority Data

Jun. 25, 2012 (JP) ................................. 2012-142300

(51) Int. Cl.
*H04L 27/28* (2006.01)
*H04L 25/49* (2006.01)
*H04L 27/26* (2006.01)
(Continued)

(52) U.S. Cl.
CPC .......... *H04L 5/0007* (2013.01); *H04L 27/2621* (2013.01); *H04L 27/2663* (2013.01)
USPC ............ 375/260; 375/296; 375/316; 370/210

(58) Field of Classification Search
CPC .............. H04L 27/2647; H04L 5/0007; H04L 27/2657; H04L 27/2662; H04L 5/0048; H04L 27/368; H04L 25/03343; H04L 27/2602; H04L 27/265; H04L 27/2614; H04L 27/2621; H04L 27/2627; H04L 27/2618; H04L 27/2623; H03F 1/3247; H03F 1/3294; H03F 2201/3233; H03F 3/24; H03G 3/3042; H04B 2201/70706; H04J 13/0059; H04J 11/003; H04J 1/00

USPC ........... 375/260, 295–297, 316; 370/203, 210
See application file for complete search history.

(56) References Cited

U.S. PATENT DOCUMENTS 5,216,694 A * 6/1993 Wei ............................... 375/286
2011/0013683 A1 * 1/2011 Cepeda Lopez .............. 375/224
(Continued)

FOREIGN PATENT DOCUMENTS

JP   2006-165781   6/2006

OTHER PUBLICATIONS

Ryu et al., "A New PAPR Reduction Scheme: SPW (Subblock Phase Weighting," IEEE, 2002, pp. 81-88.*
(Continued)

*Primary Examiner* — Tesfaldet Bocure
(74) *Attorney, Agent, or Firm* — Warner Norcross & Judd LLP (57) ABSTRACT

A modulator performs a predetermined operation for making an absolute value of an operation result of at least one element of an input signal greater than 0 on the individual elements of the input signal. The modulator generates post-operation data by associating individual elements of the input signal with individual elements of a data series which is a set of pieces of data which are equal in number to the elements of the input signal and whose absolute values are equal to one another, and multiplying the individual elements of the input signal which are subjected to the predetermined operation by the elements of the data series. An IFFT calculator performs inverse fast Fourier transformation on the post-operation data, and a synthesizer synthesizes operation results from the IFFT calculator to generate a baseband signal. A transmitter generates a transmission signal from the baseband signal and transmits the transmission signal.

8 Claims, 10 Drawing Sheets

(51) Int. Cl.
*H04J 1/00* (2006.01)
*H04L 5/00* (2006.01)

(56) References Cited

U.S. PATENT DOCUMENTS

2011/0255870 A1* 10/2011 Grigoryan et al. .............. 398/65
2014/0029681 A1* 1/2014 Zhang et al. .................. 375/260
2014/0161209 A1* 6/2014 Limberg ....................... 375/299

OTHER PUBLICATIONS

Varahram et al., "A Low Complexity Partial Transmit Sequence Scheme by Use of Dummy signals for PAPR Reduction in OFDM System," IEEE, 2010. pp. 2416-2420.*

* cited by examiner

COMMUNICATION DEVICE AND COMMUNICATION METHOD

CROSS-REFERENCE TO RELATED APPLICATION

This application claims the benefit of Japanese Patent Application No. 2012-142300, filed on Jun. 25, 2012, the entire disclosure of which is incorporated by reference herein.

FIELD

This application relates to a communication device and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without deformation. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR.

SUMMARY

Accordingly, it is desirable to reduce the PAPR and control the degree of reduction in the PAPR in OFDM communication.

According to a first aspect of the invention, there is provided a communication device for communicating with another device in orthogonal frequency-division multiplexing wireless communication, the communication device comprising:

a modulator that generates post-operation data which is a parallel signal by associating individual elements of an input signal with individual elements of a data series which is a set of pieces of data which are equal in number to the elements of the input signal and whose absolute values are equal to one another, performing a predetermined operation on the individual elements of the input signal, and multiplying the individual elements of the input signal which are subjected to the predetermined operation by the elements of the data series which are associated with the elements of the input signal, the predetermined operation making an absolute value of an operation result of at least one element of the input signal greater than 0;

an IFFT calculator that performs inverse fast Fourier transformation on the post-operation data;

a synthesizer that synthesizes operation results from the IFFT calculator to generate a baseband signal; and a transmitter that generates a transmission signal from the baseband signal and transmits the transmission signal.

It is preferable that the modulator may use, as the data series, an arbitrary data series having an auto-correlation characteristic such that an auto-correlation value between the data series and same data series whose data has not been shifted is higher than an auto-correlation value between the data series and a data series whose data has been subjected to an arbitrary shift.

According to a second aspect of the invention, there is provided a communication device for communicating with another device in orthogonal frequency-division multiplexing wireless communication, the communication device comprising:

a receiver that receives a transmission signal and generates a baseband signal;

an FFT calculator that performs serial-parallel conversion on the baseband signal and performs fast Fourier transformation on a conversion result to generate a parallel signal; and a demodulator that replaces elements whose absolute values are equal to or greater than a threshold value with 1 and replaces elements other than the elements with 0 in elements of the parallel signal.

It is preferable that the communication device may further comprise a synchronizer that uses a predetermined reception-side data series which is a set of pieces of data which are equal in number to the elements of the parallel signal and whose absolute values are equal to one another, the predetermined reception-side data series having an auto-correlation characteristic such that an auto-correlation value between the reception-side data series and same data series whose data has not been shifted is higher than an auto-correlation value between the reception-side data series and a data series whose data has been subjected to an arbitrary shift, and detects a synchronization position of the baseband signal based on a correlation between the reception-side data series and the parallel signal or between data synthesized by performing inverse fast Fourier transformation on the reception-side data series and the baseband signal, wherein the receiver receives the transmission signal, and generates the baseband signal based on the synchronization position detected by the synchronizer.

According to a third aspect of the invention, there is provided a communication method that is executed by a communication device which communicates with another device in orthogonal frequency-division multiplexing wireless communication, the communication method comprising:

a modulation step of generating post-operation data which is a parallel signal by associating individual elements of an input signal with individual elements of a data series which is a set of pieces of data which are equal in number to the elements of the input signal and whose absolute values are equal to one another, performing a predetermined operation on the individual elements of the input signal, and multiplying the individual elements of the input signal which are subjected to the predetermined operation by the elements of the data series which are associated with the elements of the input signal, the predetermined operation making an absolute value of an operation result of at least one element of the input signal greater than 0;

an IFFT calculation step of performing inverse fast Fourier transformation on the post-operation data;

a synthesis step of synthesizing operation results obtained in the IFFT calculation step to generate a baseband signal; and a transmission step of generating a transmission signal from the baseband signal and transmitting the transmission signal.

It is preferable that in the modulation step, an arbitrary data series having an auto-correlation characteristic such that an auto-correlation value between the data series and same data series whose data has not been shifted is higher than an auto-correlation value between the data series and a data series whose data has been subjected to an arbitrary shift may be used as the data series.

According to a fourth aspect of the invention, there is provided a communication method that is executed by a communication device which communicates with another device in orthogonal frequency-division multiplexing wireless communication, the communication method comprising:

a reception step of receiving a transmission signal and generates a baseband signal;

an FFT calculation step of performing serial-parallel conversion on the baseband signal and performs inverse fast Fourier transformation on a conversion result to generate a parallel signal; and a demodulation step of replacing elements whose absolute values are equal to or greater than a threshold value with 1 and replacing elements other than the elements with 0 in elements of the parallel signal.

It is preferable that the communication method may further comprise a synchronization step of using a predetermined reception-side data series which is a set of pieces of data which are equal in number to the elements of the parallel signal and whose absolute values are equal to one another, the predetermined reception-side data series having an auto-correlation characteristic such that an auto-correlation value between the reception-side data series and same data series whose data has not been shifted is higher than an auto-correlation value between the reception-side data series and a data series whose data has been subjected to an arbitrary shift, and detecting a synchronization position of the baseband signal based on a correlation between the reception-side data series and the parallel signal or between data synthesized by performing inverse fast Fourier transformation on the reception-side data series and the baseband signal, wherein in the reception step, the transmission signal is received, and the baseband signal is generated based on the synchronization position detected in the synchronization step.

According to the invention, it is possible to reduce the PAPR in OFDM communication, and further control the degree of reduction in the PAPR.

BRIEF DESCRIPTION OF THE DRAWINGS

A more complete understanding of this application can be obtained when the following detailed description is considered in conjunction with the following drawings, in which.

DETAILED DESCRIPTION

An exemplary embodiment of the invention will be described in detail hereinbelow with reference to the accompanying drawings Like or same reference numerals are given to those components which are the same as, or correspond to, the components shown in the diagrams. IFFT (Inverse Fast Fourier Transformation) is a concept including both IFFT and IDFT (Inverse Discrete Fourier Transformation) hereinafter. Therefore, the embodiment may be configured to perform IDFT instead of IFFT. Likewise, FFT (Fast Fourier Transformation) is a concept including both FFT and DFT (Discrete Fourier Transformation) hereinafter. When IDFT and DFT are carried out, an FFT size means the size of DFT hereinafter.

First Embodiment

Figure 1:
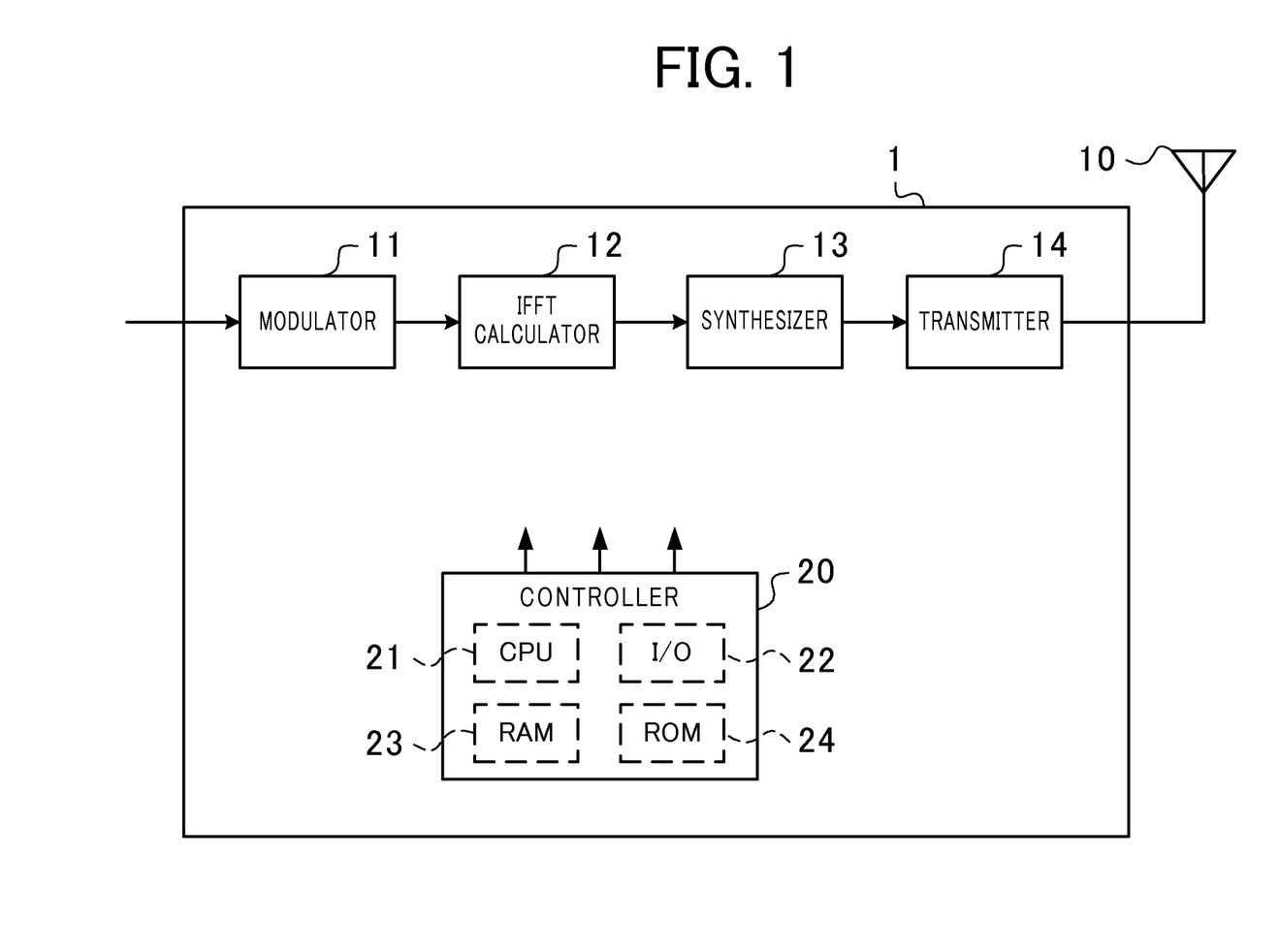
FIG. 1 is a block diagram illustrating a configuration example of a communication device according to a first embodiment of the invention.

FIG. 1 is a block diagram illustrating a configuration example of a communication device according to a first embodiment of the invention. The communication device 1 communicates with another device in OFDM (Orthogonal Frequency-Division Multiplexing) wireless communication. The communication device 1 includes an antenna 10, a modulator 11, an IFFT calculator 12, a synthesizer 13, a transmitter 14, and a controller 20.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication device 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication device 1. The controller 20 controls the communication device 1 based on the control program.

Figure 2:
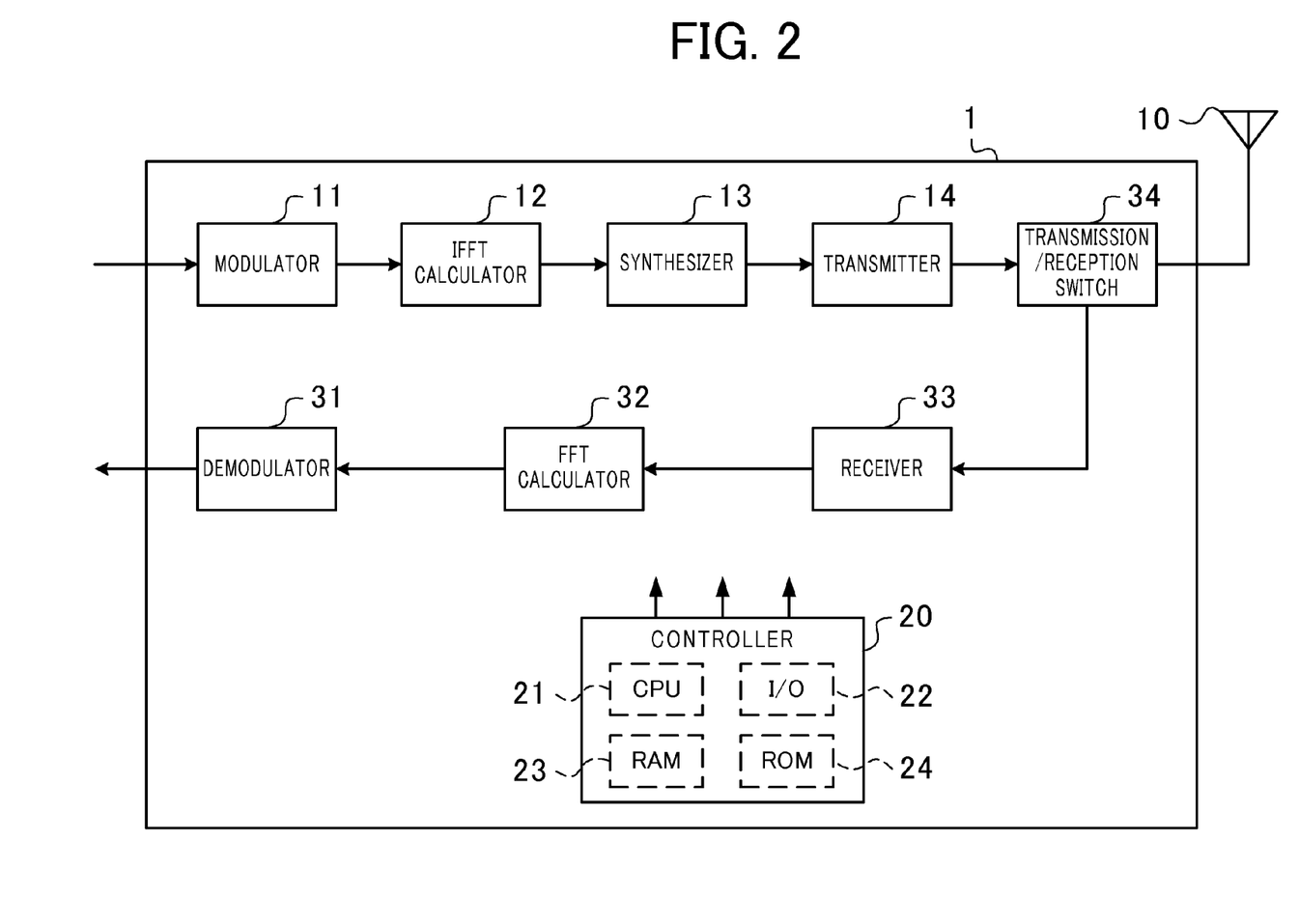
FIG. 2 is a block diagram illustrating a different configuration example of the communication device according to the first embodiment.

FIG. 2 is a block diagram illustrating a different configuration example of the communication device according to the first embodiment. To provide the communication device 1 with a reception function, the communication device 1 shown in FIG. 2 further includes a demodulator 31, an FFT calculator 32, a receiver 33, and a transmission/reception switch 34. Referring to the communication device 1 shown in FIG. 2 which has the transmission function and the reception function, a communication method which is carried out by the communication device 1 is described hereinbelow.

The modulator 11 performs a predetermined operation to make the absolute value of an operation result of at least one element of an input signal greater than 0 on the individual elements of the input signal. The number of elements of an input signal d is N, and the input signal d is expressed by the following equation (1). The values of the individual elements of the input signal d are 0 or 1.

[Eq. 1]

$$d = [d_1 \ldots d_N] \tag{1}$$

The individual elements $g_i$ of the input signal which have been subjected to the operation are expressed by the following equation (2). Provided that α and β in the equation (2) are positive real numbers, the individual elements $g_i$ of the input signal which have been subjected to the operation become positive real numbers.

[Eq. 2]

$$g_i = \alpha \cdot d_i + \beta \, (i=1,2,\ldots,N) \tag{2}$$

Using a data series expressed by the following equation (3) that is a set of pieces of data which are equal in number to the elements of the input signal d and whose absolute values are equal to one another, the modulator 11 associates individual elements $d_i$ of the input signal d with the individual elements of the data series in one to one. Then, the modulator 11 multiplies the individual elements $g_i$ of the input signal which have been subjected to the operation expressed by the equation (2) by the elements of the data series which are associated with the elements $g_i$ and performs serial-parallel conversion to generate post-operation data h which is a parallel signal. The modulator 11 sends the post-operation data h to the IFFT calculator 12. Individual elements $h_i$ of the post-operation data h are expressed by the following equation (4). The values of α and β are determined beforehand in consideration of the degree of reduction in a PAPR (Peak-to-Average Power Ratio) and a BER (Bit Error Rate) as will be described later.

[Eq. 3]

$$c = [c_1 \ldots c_N] \tag{3}$$

[Eq. 4]

$$h_i = c_i \cdot (\alpha \cdot d_i + \beta)(i=1,2,\ldots,N) \tag{4}$$

Using a data series which is a parallel signal, the modulator 11 may be configured to perform serial-parallel conversion on the input signal d, perform the operation expressed by the equation (2) on the individual elements $d_i$ of the input signal d which have been subjected to the serial-parallel conversion, and multiply the individual elements of the input signal which have been subjected to the operation by the associated individual elements of the data series. Further, the modulator 11 may be configured to perform serial-parallel conversion after performing the operation expressed by the equation (2) on the individual elements $d_i$ of the input signal d, and multiply the individual elements which have been subjected to the serial-parallel conversion by the associated individual elements of the data series.

The modulator 11 can use, as the data series, an arbitrary data series having an auto-correlation characteristic such that an auto-correlation value between the data series and same data series whose data has not been shifted is higher than an auto-correlation value between the data series and a data series whose data has been subjected to an arbitrary shift. The data series whose data has been subjected to an arbitrary shift differs from a data series whose data has not been shifted in the value of at least one element. A CAZAC (Constant Amplitude Zero Auto-Correlation) sequence, for example, can be used as such a data series.

Figure 3A:
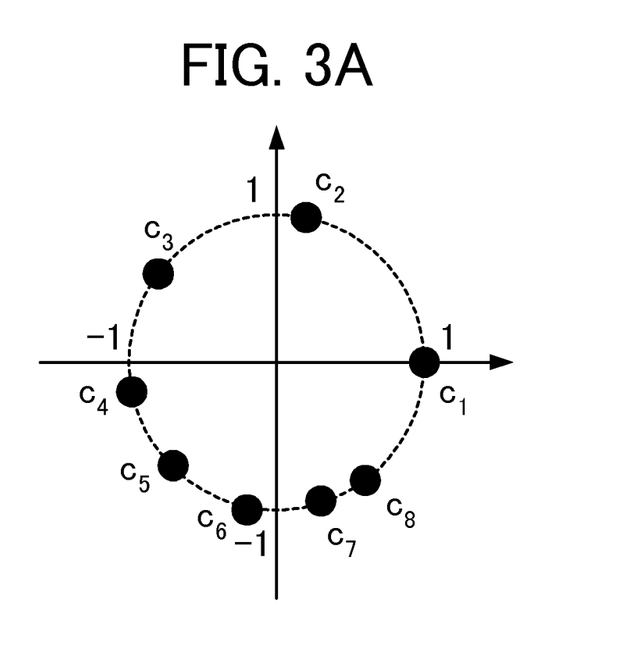
FIG. 3A is a diagram illustrating an example of a modulation process that is executed by a modulator according to the first embodiment.
Figure 3B:
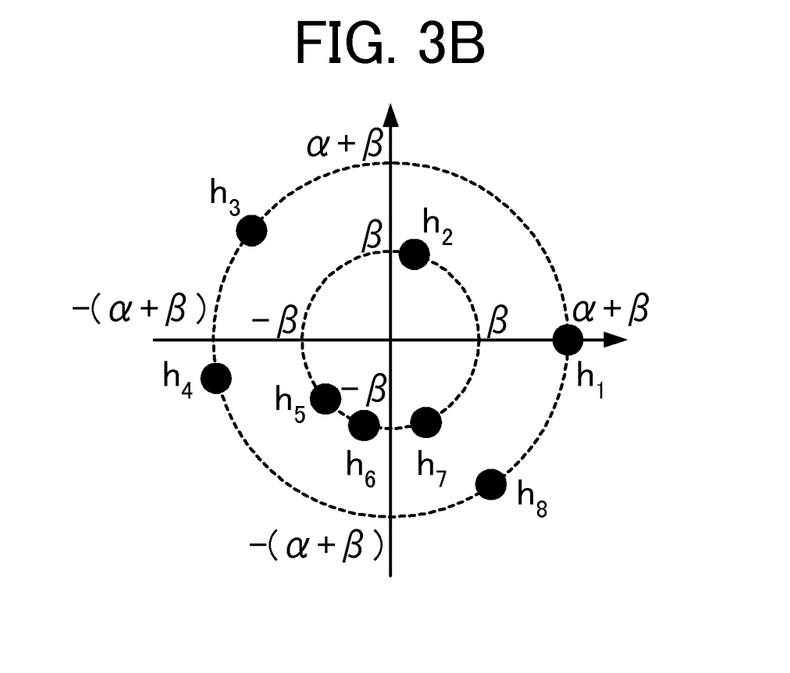
FIG. 3B is a diagram illustrating an example of the modulation process that is executed by the modulator according to the first embodiment.

FIGS. 3A and 3B are diagrams illustrating examples of a modulation process that is executed by the modulator 11 according to the first embodiment. For example, an input signal d expressed by the following equation (5) and having eight elements is used.

[Eq. 5]

$$d = [10110001] \tag{5}$$

FIG. 3A shows individual elements of the data series expressed by the equation (3) on a complex plane. To make an operation example easy to understand, the absolute value of each element of the data series is set to "1". FIG. 3B shows individual elements $h_i$ of the post-operation data h expressed by the equation (4) on a complex plane. Because elements $d_1$, $d_3$, $d_4$, $d_8$ of the input signal d are 1, $h_1$, $h_3$, $h_4$, $h_8$ are positioned on the circumference with a radius α+β about the origin of the complex plane as the center. Because elements $d_2$, $d_5$, $d_6$, $d_7$ of the input signal d are 0, $h_2$, $h_5$, $h_6$, $h_7$ are positioned on the circumference with a radius β about the origin of the complex plane as the center.

The IFFT calculator 12 performs IFFT on the post-operation data h as expressed by the following equation (6), and sends an operation result to the synthesizer 13.

[Eq. 6]

$$u = F^{-1} \cdot h \tag{6}$$

The synthesizer 13 synthesizes the operation results from the IFFT calculator 12 to generate a baseband signal, and sends the baseband signal to the transmitter 14. The transmitter 14 generates a transmission signal from the baseband signal, and sends the transmission signal to another device via the transmission/reception switch 34 and the antenna 10.

Figure 4:
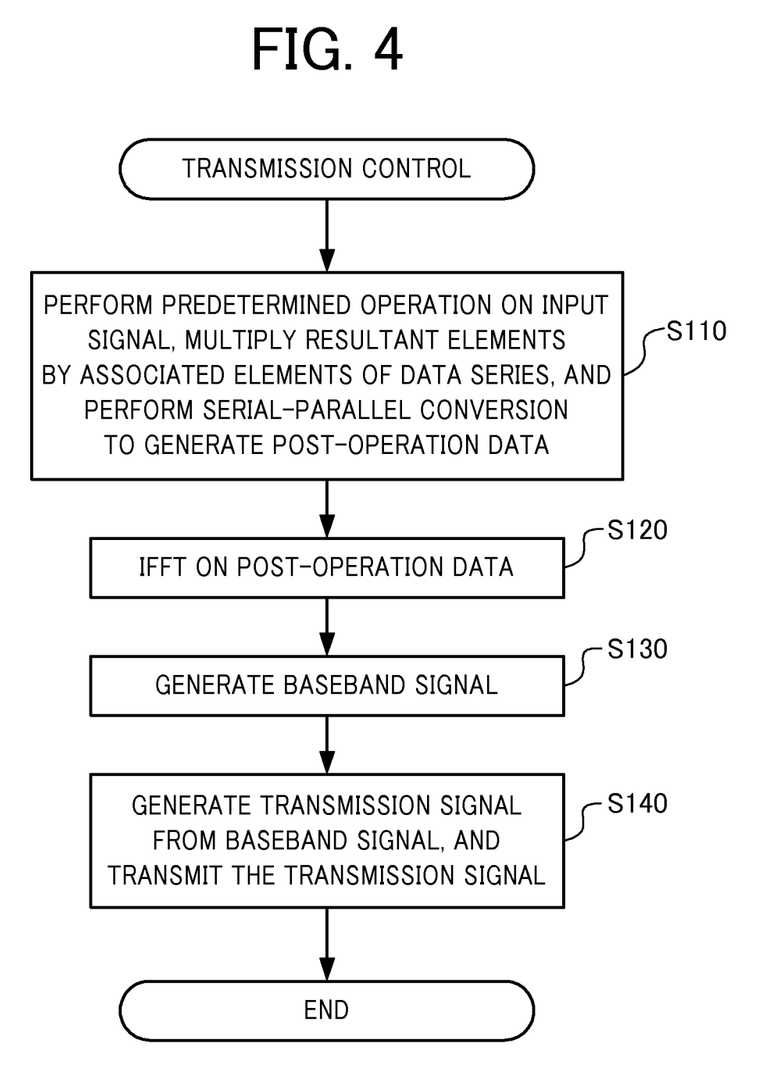
FIG. 4 is a flowchart illustrating an example of a transmission control operation that is executed by the communication device according to the first embodiment.

FIG. 4 is a flowchart illustrating an example of a transmission control operation that is executed by the communication device according to the first embodiment. The modulator 11 performs a predetermined operation on the individual elements $d_i$ of the input signal d, multiplies the resultant elements by the elements of a data series which are associated with the elements $d_i$, and performs serial-parallel conversion to generate post-operation data h which is a parallel signal (step S110).

The IFFT calculator 12 performs IFFT on the post-operation data h (step S120). The synthesizer 13 synthesizes the operation results from the IFFT calculator 12 to generate a baseband signal (step S130). The transmitter 14 generates a transmission signal from the baseband signal, and sends the transmission signal to another device via the transmission/reception switch 34 and the antenna 10 (step S140). When the transmission process in step S140 is completed, the process is terminated.

Processing on the reception side is described below. The receiver 33 receives a transmission signal via the antenna 10 and the transmission/reception switch 34, generates a baseband signal, and sends the baseband signal to the FFT calculator 32. The FFT calculator 32 performs serial-parallel conversion on the baseband signal, and performs FFT on a resultant signal as expressed by the following equation (7) to generate a parallel signal v. The FFT calculator 32 sends the parallel signal v to the demodulator 31. Because the individual elements of the parallel signal v coincide with the individual elements $h_i$ of the post-operation data h, the absolute values of the individual elements of the parallel signal v are expressed by the following equation (8). The suffix "T" represents that a matrix is shown transposed.

[Eq. 7]

$$v = F \cdot u \quad (7)$$

[Eq. 8]

$$|v| = [|v_1| \ldots |v_N|]^T \quad (8)$$
$$= [|h_1| \ldots |h_N|]^T$$
$$= [|c_1 \cdot (\alpha \cdot d_1 + \beta)| \ldots |c_N \cdot (\alpha \cdot d_N + \beta)|]^T$$

The demodulator 31 replaces elements whose absolute values are equal to or greater than a threshold value with 1 and replaces elements other than the elements with 0 in the elements of the parallel signal v. The threshold value is determined based on the predetermined operation that is executed by the transmission-side modulator 11. The individual elements $h_i$ of the post-operation data h is expressed by the following equation (9) when $d_i=0$, and is expressed by the following equation (10) when $d_i=1$.

[Eq. 9]

$$h_i = c_i \cdot \beta \quad (9)$$

[Eq. 10]

$$h_i = c_i \cdot (\alpha + \beta) \quad (10)$$

When $\alpha$ in the equation (2) is set larger than $\beta$, for example, the threshold value is set to a value obtained by multiplying the average value of $\alpha$ and $\beta$ by the absolute value of the elements of the data series given by the equation (3). Then, the demodulator 31 can restore the input signal d on the reception side by replacing elements whose absolute values are equal to or greater than the threshold value with 1 and replacing elements whose absolute values are less than the threshold value with 0 in the elements of the parallel signal v. The demodulator 31 may be configured to replace elements whose absolute values are greater than the threshold value with 1 and replace elements whose absolute values are equal to or less than the threshold value with 0 in the elements of the parallel signal v. The threshold value is not limited to the aforementioned value, and can take any value that permits the elements expressed by the equation (9) to be distinguished from the elements expressed by the equation (10) on the reception side. For example, the threshold value may be set to a value obtained by multiplying the average value of $\beta$ and $\alpha$ added to $\beta$ by the absolute value of the elements of the data series given by the equation (3).

Figure 5:
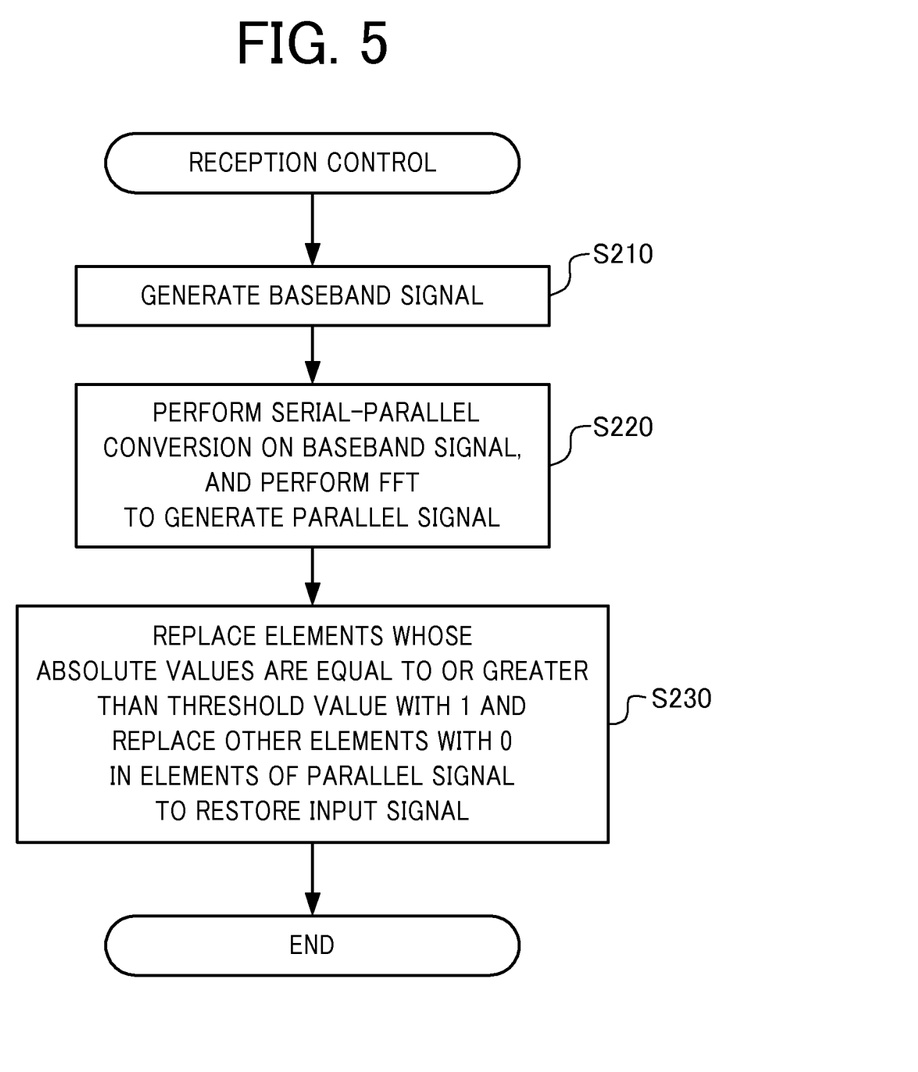
FIG. 5 is a flowchart illustrating an example of a reception control operation that is executed by the communication device according to the first embodiment.

FIG. 5 is a flowchart illustrating an example of a reception control operation that is executed by the communication device according to the first embodiment. The receiver 33 receives a transmission signal via the antenna 10 and the transmission/reception switch 34, and generates a baseband signal (step S210). The FFT calculator 32 performs serial-parallel conversion on the baseband signal and performs FFT to generate a parallel signal v (step S220). The demodulator 31 replaces the elements whose absolute values are equal to or greater than the threshold value with 1 and replaces the other elements than the elements with 0 in the elements of the parallel signal v to restore the input signal d (step S230). When the restoring process in step S230 is completed, the processing is terminated.

The communication device 1 executes communication, for example, as follows according to the above-described principle. Suppose that the input signal d is expressed by the following equation (11). In addition, the modulator 11 uses a CAZAC sequence expressed by the following equation (12) as a data series.

[Eq. 11]

$$d = [1011] \quad (11)$$

[Eq. 12]

$$c = [c_1 c_2 c_3 c_4] \quad (12)$$

Provided that $\alpha$ in the equation (2) is 2 and $\beta$ is 1, the post-operation data h is expressed by the following equation (13).

[Eq. 13]

$$h = \begin{bmatrix} 3c_1 \\ c_2 \\ 3c_3 \\ 3c_4 \end{bmatrix} \quad (13)$$

The processing on the reception side is described below. The parallel signal v matches with the equation (13). Provided that the absolute values of the individual elements of the CAZAC sequence are 1 for ease of understanding the operation example, the absolute values of the individual elements of the parallel signal v are expressed by the following equation (14).

[Eq. 14]

$$|v| = \begin{bmatrix} 3 \\ 1 \\ 3 \\ 3 \end{bmatrix} \quad (14)$$

Provided that the threshold value is 2 which is the average value of $\beta$ and $\alpha$ added to $\beta$, the input signal d expressed by the equation (11) can be restored on the reception side by replacing the elements in whose absolute values are equal to or greater than the threshold value with 1, and replacing the element other than the elements with 0.

As described above, the communication device 1 according to the first embodiment of the invention can reduce the PAPR in OFDM communication by generating a baseband signal based on post-operation data h generated by performing a predetermined operation on an input signal d and multiplying the resultant elements by the elements of a predetermined data series. As will be discussed later, the communication device 1 can reduce the PAPR and control the degree of reduction in the PAPR.

Second Embodiment

Figure 6:
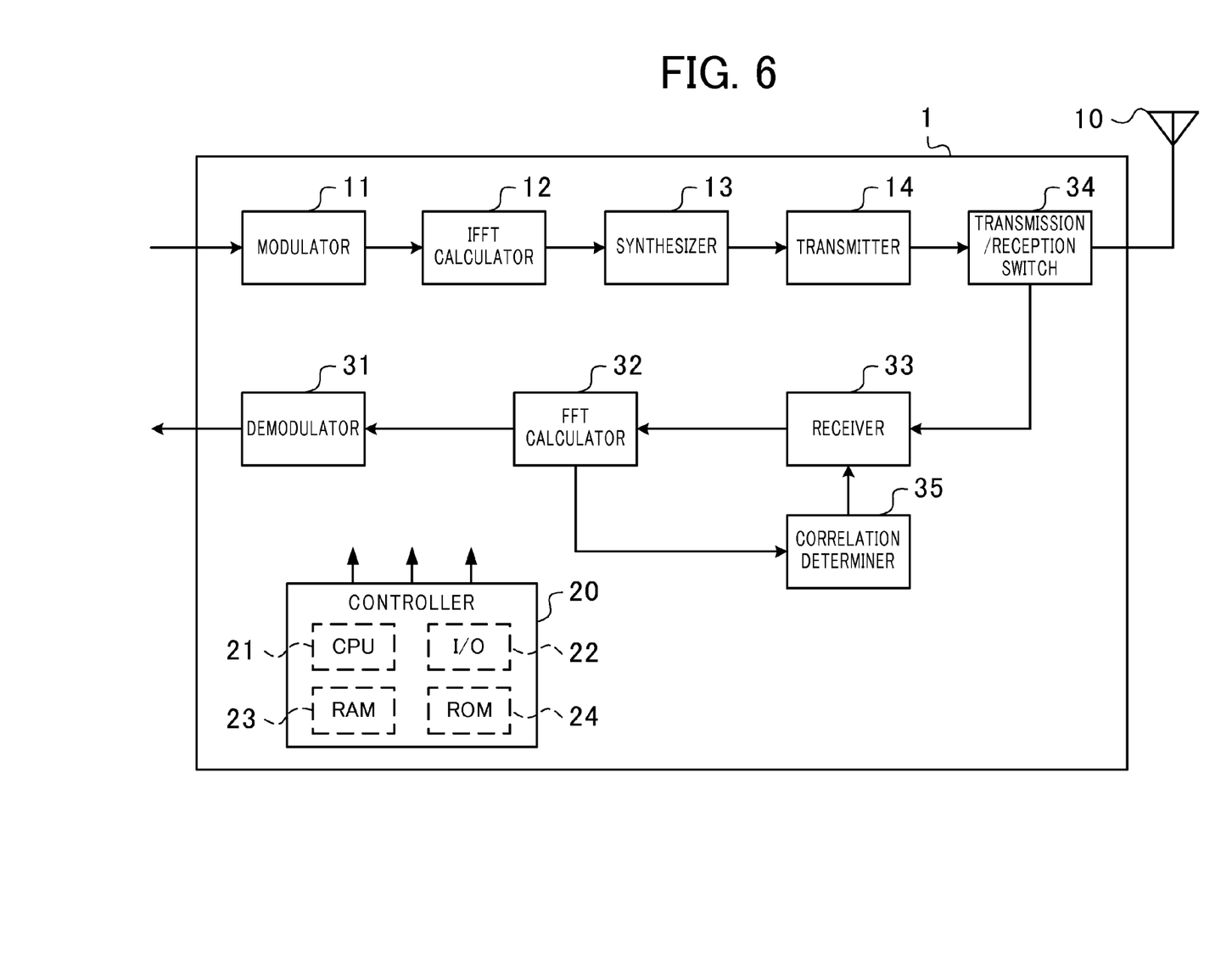
FIG. 6 is a block diagram illustrating a configuration example of a communication device according to a second embodiment of the invention.

FIG. 6 is a block diagram illustrating a configuration example of a communication device according to a second embodiment of the invention. The communication device 1 according to the second embodiment includes a correlation determiner 35 in addition to the configuration of the communication device 1 according to the first embodiment. The modulator 11 uses, as the data series, an arbitrary data series having an auto-correlation characteristic such that an auto-correlation value between the data series and same data series whose data has not been shifted is higher than an auto-correlation value between the data series and a data series whose data has been subjected to an arbitrary shift. The correlation determiner 35 analyzes the correlation between the parallel signal v generated by the FFT calculator 32 and a reception-side data series which is the same data series as the data series used by the modulator 11, and detects the synchronization position of the baseband signal based on the correlation.

Figure 7:
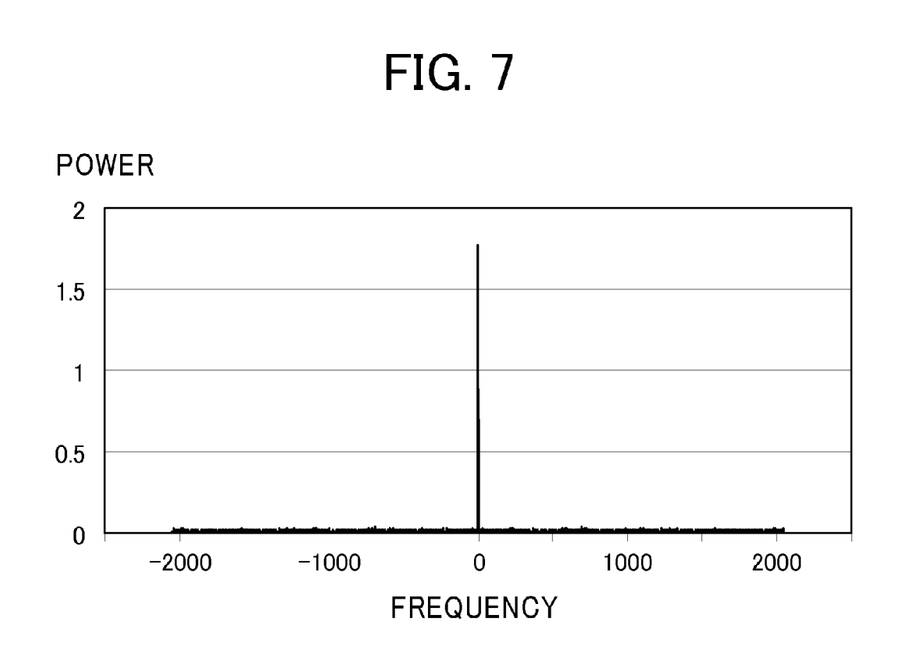
FIG. 7 is a diagram showing results of simulated correlation analysis.

FIG. 7 is a diagram showing results of simulated correlation analysis. The abscissa represents the frequency (unit: reciprocal of the symbol length of the input signal d) and the ordinate represents power indicating whether there is a correlation. The frequency is a value corrected in such a way that the value of the frequency when the power takes a peak value becomes 0. In the example of FIG. 7, a positive peak appears. The synchronization position of the baseband signal can be detected based on whether there is a peak at which the power becomes greater than a predetermined value. The receiver 33 generates a baseband signal from the received signal based on the synchronization position of the baseband signal.

Figure 8:
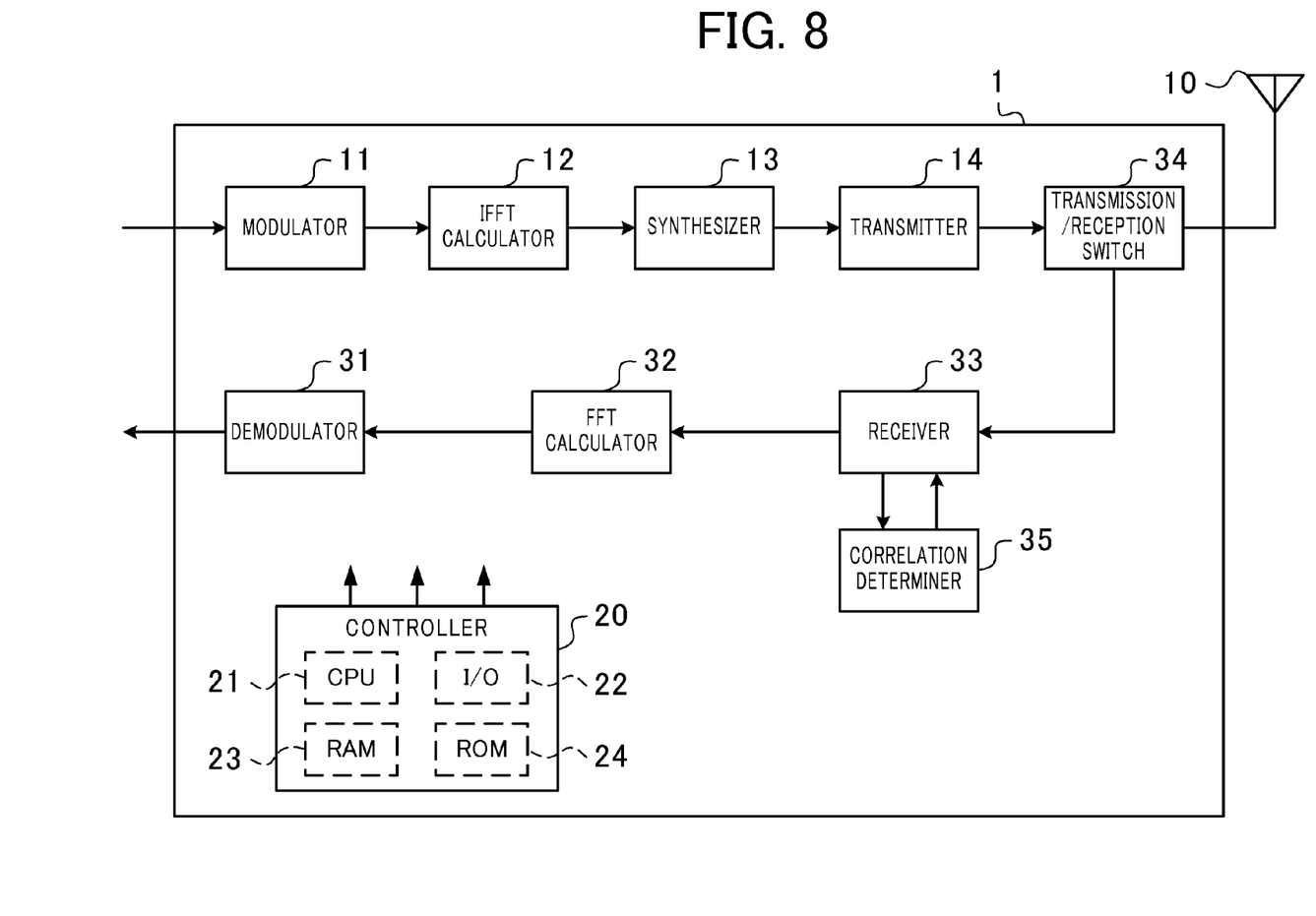
FIG. 8 is a block diagram illustrating a different configuration example of the communication device according to the second embodiment.

FIG. 8 is a block diagram illustrating a different configuration example of the communication device according to the second embodiment. The location of the correlation determiner 35 differs from that of the communication device 1 shown in FIG. 6. The correlation determiner 35 receives a baseband signal from the receiver 33, analyzes the correlation between synthesized data obtained by performing IFFT on the reception-side data series and the baseband signal, and detects the synchronization position of the baseband signal based on the correlation.

Figure 9:
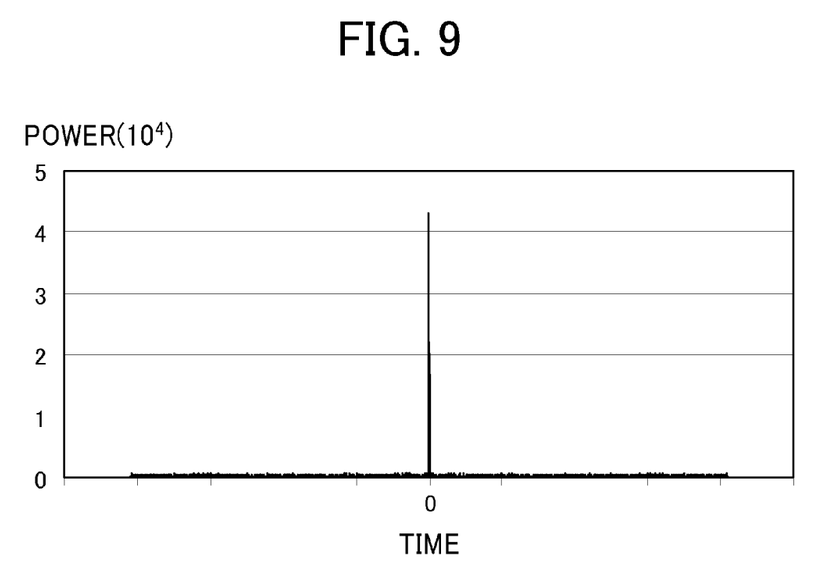
FIG. 9 is a diagram showing results of simulated correlation analysis.

FIG. 9 is a diagram showing results of simulated correlation analysis. The abscissa represents the time (unit: the symbol length of the input signal d) and the ordinate represents power indicating whether there is a correlation. The time is a value corrected in such a way that the value of the time when the power takes a peak value becomes 0. In the example of FIG. 9, a positive peak appears. As in the aforementioned example, the synchronization position of the baseband signal can be detected based on whether there is a peak at which the power becomes greater than a predetermined value.

As described above, the communication device 1 according to the second embodiment of the invention performs an operation on an input signal d by using a data series having an auto-correlation value so that the communication device 1 can detect the synchronization position of a baseband signal using the data series.

Specific Examples

Next, the effects of the invention according to the embodiment are described based on the results of simulation. Simulation of repeatedly generating a baseband signal and calculating a PAPR using a random signal as an input signal d was performed on the related art and the embodiment of the invention. The input signal d having 4096 elements was used to compare the CCDF (Complementary Cumulative Distribution Function) of PAPRs, namely the characteristic of the probability of occurrence of a PAPR, according to the related art and the CCDF of PAPRs according to the embodiment of the invention.

The related art concerns a method of generating a baseband signal by performing IFFT on a subcarrier modulation signal generated by modulating an input signal d by a predetermined modulation scheme such as QPSK (Quadrature Phase-Shift Keying) and assigning the modulated signal to subcarriers, without performing the foregoing operation. With regard to the related art, the simulation was conducted with QPSK used as the modulation scheme and the FFT size being 2048. Because the transmission-side processing of the communication device 1 according to the first embodiment is identical to that of the communication device 1 according to the second embodiment, the simulation was conducted using the communication device 1 according to the first embodiment.

Figure 10:
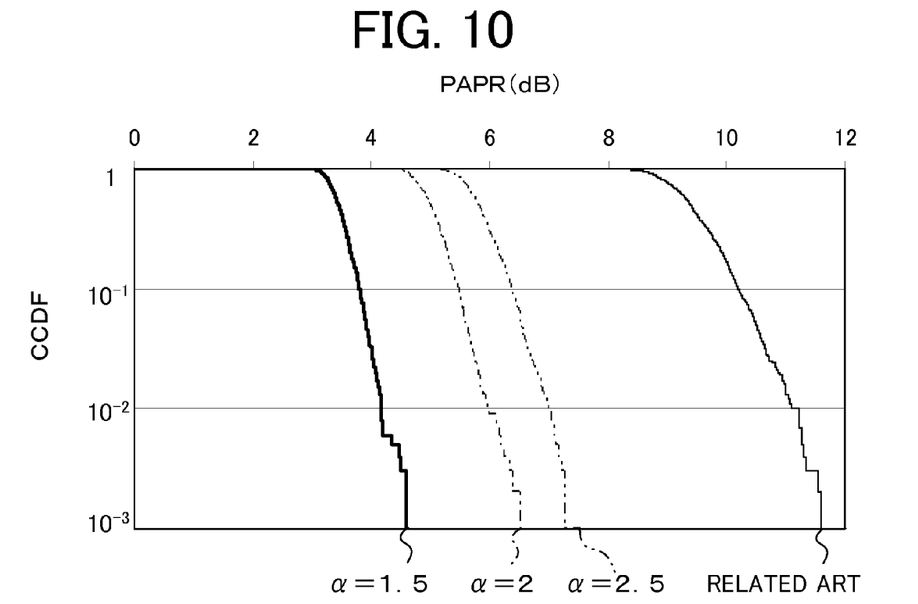
FIG. 10 is a diagram illustrating simulated CCDF characteristics of the PAPRs of baseband signals.

FIG. 10 is a diagram illustrating simulated CCDF characteristics of the PAPRs of baseband signals. The abscissa represents the PAPR (unit: dB), and the ordinate represents the CCDF of the PAPR. A thin solid-line graph represents the CCDF characteristic of the PAPR according to the related art. With regard to the embodiment, the simulation was conducted with the operation expressed by the equation (2) being performed on the individual elements of the input signal d, the CAZAC sequence used in which the absolute value of each element is 1 and the FFT size being set to 4096. The value of $\alpha$ in the equation (2) was varied with $\beta=1$. A thick solid-line graph represents the embodiment when $\alpha=1.5$, a dotted-line graph represents the embodiment when $\alpha=2$, and a graph of a two-dot chain line represents the embodiment when $\alpha=2.5$. In any of the cases, the PAPR according to the embodiment of the invention was reduced as compared to the PAPR according to the related art.

According to the related art, when identical signals which provide a subcarrier modulation signal the phases of whose elements have the same value are used as the input signal d, the PAPR is 33.1 dB. Similar simulation was conducted on such an input signal d with $\alpha=2$ and $\beta=1$ according to the embodiment. When the input signal d was all 0 or 1, the PAPR according to the embodiment of the invention was 0 dB. When the input signal d has 01 or 10 repeated, the PAPR according to the embodiment of the invention was 2 dB. It is apparent that when the input signals d are identical, the use of the embodiment of the invention reduces the PAPR significantly.

Figure 11:
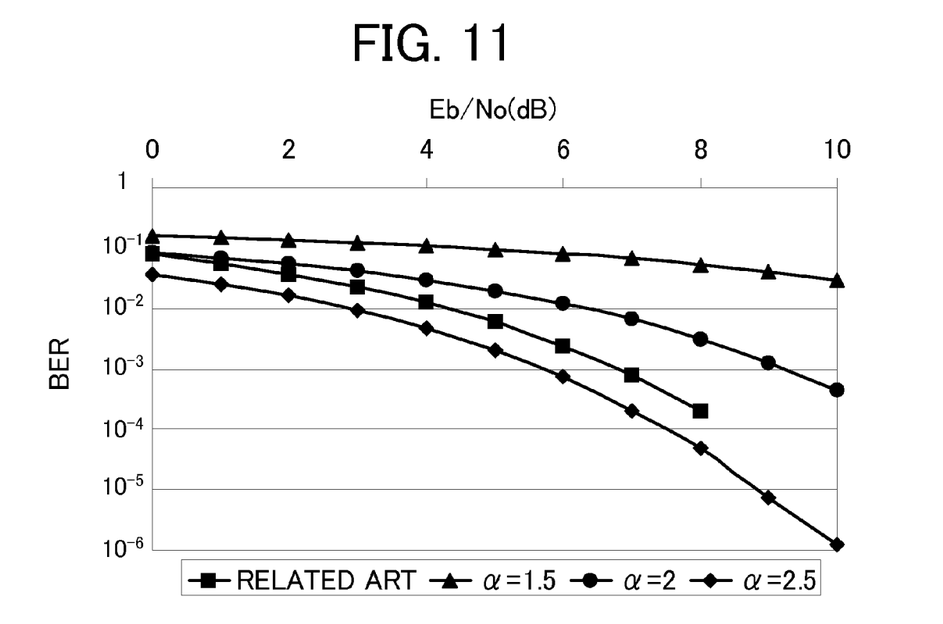
FIG. 11 is a diagram showing simulated BER characteristics.

Simulation was likewise performed on the BER (Bit Error Rate). The threshold value used by the demodulator 31 is the average value of $\alpha$ and $\beta$. FIG. 11 is a diagram showing simulated BER characteristics. The abscissa represents the Eb/No (Energy per Bit to NOise power spectral density ratio), and the ordinate represents the BER. The unit of Eb/No is dB. A graph showing the plot points by squares represents the BER according to the related art. A graph showing the plot points by triangles represents the BER according to the embodiment when $\alpha=1.5$, a graph showing the plot points by circles represents the BER according to the embodiment when $\alpha=2$, and a graph showing the plot points by rhomboids represents the BER according to the embodiment when $\alpha=2.5$. It is apparent that with $\alpha=2.5$, the BER is improved as compared to the related art. This is because the average power of the transmission signal is higher when $\alpha=2.5$ than that in the other cases.

The ratio of the average power of the transmission signal according to the embodiment of the invention to the average power of the transmission signal according to the related art was 164% when $\alpha=1.5$, 250% when $\alpha=2$, and 364% when $\alpha=2.5$. Increasing the average power as in the case of $\alpha=2.5$ can reduce the PAPR and further improve the BER as compared to the related art.

It is apparent from the above-described simulation that according to the embodiment, the PAPR can be reduced by generating a baseband signal based on post-operation data h generated by performing a predetermined operation on an input signal d and multiplying the elements of the resultant signal by the elements of a predetermined data series. It is also apparent that the degree of reduction in the PAPR and the degree of improvement on the BER can be controlled by changing the predetermined operation to be performed on the input signal d.

The modes of the invention are not limited to the foregoing embodiments. A predetermined operation which is performed by the modulator 11 is not limited to the one expressed by the equation (2), and can be any operation which provides such a result that the absolute value of the operation result of at least one element of an input signal d becomes greater than 0. Although the operation is performed on the individual elements $d_i$ of the input signal d using the same $\alpha$ and $\beta$ in the example of the equation (2), the operation may be performed on the input signal d using $\alpha_i$ and $\beta_i$ which are determined for each element as shown in the following equation (15). In this case, information on $\alpha_i$ and $\beta_i$ is held on the reception side, and a value which is obtained, for example, by multiplying the average value of $\alpha_i$ and $\beta_i$ by the absolute value of the elements of the data series is used as the threshold value. If the absolute value of the elements of the parallel signal v is 1 for ease of understanding the operation example, the threshold value is expressed by the following equation (16). The demodulator 31 restores the input signal d by setting the elements whose absolute values are equal to or greater than the threshold value to 1 and setting the other elements to 0 in the elements of the parallel signal v.

[Eq. 15]
$$h_i = c_i \cdot (\alpha_i \cdot d_i + \beta_i) \tag{15}$$

[Eq. 16]
$$\left[ \frac{\alpha_1 + \beta_1}{2} \ldots \frac{\alpha_N + \beta_N}{2} \right]^T \tag{16}$$

The IFFT calculator 12 may be configured to execute IDFT instead of IFFT, and the FFT calculator 32 may be configured to execute DFT instead of FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication device for communicating with another device in orthogonal frequency-division multiplexing wireless communication, the communication device comprising:
a modulator that generates post-operation data which is a parallel signal by associating individual elements of an input signal with individual elements of a data series which is a set of pieces of data which are equal in number to the elements of the input signal and whose absolute values are equal to one another, performing a predetermined operation on the individual elements of the input signal, and multiplying the individual elements of the input signal which are subjected to the predetermined operation by the elements of the data series which are associated with the elements of the input signal, the predetermined operation making an absolute value of an operation result of at least one element of the input signal greater than 0;
an IFFT calculator that performs inverse fast Fourier transformation on the post-operation data;
a synthesizer that synthesizes operation results from the IFFT calculator to generate a baseband signal; and
a transmitter that generates a transmission signal from the baseband signal and transmits the transmission signal.

2. The communication device according to claim 1, wherein the modulator uses, as the data series, an arbitrary data series having an auto-correlation characteristic such that an auto-correlation value between the data series and same data series whose data has not been shifted is higher than an auto-correlation value between the data series and a data series whose data has been subjected to an arbitrary shift.

3. The communication device according to claim 1, further comprising:
a receiver that receives the transmission signal and generates the baseband signal;
an FFT calculator that performs serial-parallel conversion on the baseband signal and performs fast Fourier transformation on a conversion result to generate a parallel signal; and
a demodulator that replaces elements whose absolute values are equal to or greater than a threshold value with 1 and replaces elements other than the elements with 0 in elements of the parallel signal.

4. The communication device according to claim 3, further comprising a synchronizer that uses a predetermined reception-side data series which is a set of pieces of data which are equal in number to the elements of the parallel signal and whose absolute values are equal to one another, the predetermined reception-side data series having an auto-correlation characteristic such that an auto-correlation value between the reception-side data series and same data series whose data has not been shifted is higher than an auto-correlation value between the reception-side data series and a data series whose data has been subjected to an arbitrary shift, and detects a synchronization position of the baseband signal based on a correlation between the reception-side data series and the parallel signal or between data synthesized by performing inverse fast Fourier transformation on the reception-side data series and the baseband signal, wherein the receiver receives the transmission signal, and generates the baseband signal based on the synchronization position detected by the synchronizer.

5. A communication method that is executed by a communication device which communicates with another device in orthogonal frequency-division multiplexing wireless communication, the communication method comprising:
a modulation step of generating post-operation data which is a parallel signal by associating individual elements of an input signal with individual elements of a data series which is a set of pieces of data which are equal in number to the elements of the input signal and whose absolute values are equal to one another, performing a predetermined operation on the individual elements of the input signal, and multiplying the individual elements of the input signal which are subjected to the predetermined operation by the elements of the data series which are associated with the elements of the input signal, the predetermined operation making an absolute value of an operation result of at least one element of the input signal greater than 0;
an IFFT calculation step of performing inverse fast Fourier transformation on the post-operation data;

a synthesis step of synthesizing operation results obtained in the IFFT calculation step to generate a baseband signal; and a transmission step of generating a transmission signal from the baseband signal and transmitting the transmission signal.

6. The communication method according to claim 5, wherein in the modulation step, an arbitrary data series having an auto-correlation characteristic such that an auto-correlation value between the data series and same data series whose data has not been shifted is higher than an auto-correlation value between the data series and a data series whose data has been subjected to an arbitrary shift is used as the data series.

7. The communication method according to claim 5, further comprising:

a reception step of receiving the transmission signal and generates the baseband signal;

an FFT calculation step of performing serial-parallel conversion on the baseband signal and performs inverse fast Fourier transformation on a conversion result to generate a parallel signal; and a demodulation step of replacing elements whose absolute values are equal to or greater than a threshold value with 1 and replacing elements other than the elements with 0 in elements of the parallel signal.

8. The communication method according to claim 7, further comprising a synchronization step of using a predetermined reception-side data series which is a set of pieces of data which are equal in number to the elements of the parallel signal and whose absolute values are equal to one another, the predetermined reception-side data series having an auto-correlation characteristic such that an auto-correlation value between the reception-side data series and same data series whose data has not been shifted is higher than an auto-correlation value between the reception-side data series and a data series whose data has been subjected to an arbitrary shift, and detecting a synchronization position of the baseband signal based on a correlation between the reception-side data series and the parallel signal or between data synthesized by performing inverse fast Fourier transformation on the reception-side data series and the baseband signal, wherein in the reception step, the transmission signal is received, and the baseband signal is generated based on the synchronization position detected in the synchronization step.

* * * * *